US009321658B2

(12) United States Patent
Chen et al.

(10) Patent No.: US 9,321,658 B2
(45) Date of Patent: Apr. 26, 2016

(54) SYSTEMS AND METHODS FOR FLUID TREATMENT WITH HOMOGENEOUS DISTRIBUTION OF ULTRAVIOLET LIGHT

(71) Applicants: Jianfeng Chen, Ballston Lake, NY (US); Rajul V. Randive, Niskayuna, NY (US); Craig Moe, Latham, NY (US)

(72) Inventors: Jianfeng Chen, Ballston Lake, NY (US); Rajul V. Randive, Niskayuna, NY (US); Craig Moe, Latham, NY (US)

(73) Assignee: CRYSTAL IS, INC., Green Island, NY (US)

( * ) Notice: Subject to any disclaimer, the term of this patent is extended or adjusted under 35 U.S.C. 154(b) by 0 days.

(21) Appl. No.: 14/472,733

(22) Filed: Aug. 29, 2014

(65) Prior Publication Data

US 2015/0060692 A1 Mar. 5, 2015

Related U.S. Application Data

(60) Provisional application No. 61/871,630, filed on Aug. 29, 2013.

(51) Int. Cl.
*C02F 1/32* (2006.01)

(52) U.S. Cl.
CPC ......... *C02F 1/325* (2013.01); *C02F 2201/3222* (2013.01); *C02F 2201/3227* (2013.01); *C02F 2201/3228* (2013.01)

(58) Field of Classification Search
CPC ....................................................... C02F 1/32
USPC ....................................................... 250/435
See application file for complete search history.

(56) References Cited

U.S. PATENT DOCUMENTS

| | | | |
|---|---|---|---|
| 1,196,481 A | 8/1916 | Von Reclinghausen et al. | |
| 3,182,193 A | 5/1965 | Ellner et al. | |
| 4,367,410 A | 1/1983 | Wood | |
| 4,482,809 A | 11/1984 | Maarschalkerweerd | |
| 4,661,264 A | 4/1987 | Goudy, Jr. | |
| 4,757,205 A | 7/1988 | Latel et al. | |
| 4,872,980 A | 10/1989 | Maarschalkerweerd | |
| 5,120,450 A | 6/1992 | Stanley, Jr. | |
| 5,418,370 A | 5/1995 | Maarschalkerweerd | |
| 5,660,719 A | 8/1997 | Kurtz et al. | |
| 6,090,296 A * | 7/2000 | Oster | 210/748.12 |
| 6,264,802 B1 | 7/2001 | Kamrukov et al. | |
| 6,303,087 B1 | 10/2001 | Wedekamp | |
| 6,464,884 B1 | 10/2002 | Gadgil | |
| 6,500,346 B1 | 12/2002 | Taghipour et al. | |
| 6,565,757 B1 | 5/2003 | Wedkamp | |
| 6,616,839 B1 | 9/2003 | Peterson et al. | |
| 6,919,019 B2 | 7/2005 | Baca et al. | |
| 6,940,075 B2 | 9/2005 | Schulz | |
| 7,169,311 B2 | 1/2007 | Saccomanno | |

(Continued)

OTHER PUBLICATIONS

PCT International Patent Application No. PCT/US2014/053380, International Search Report and Written Opinion mailed Dec. 26, 2014, 11 pages.

*Primary Examiner* — Robert Kim
*Assistant Examiner* — Eliza Osenbaugh-Stewar
(74) *Attorney, Agent, or Firm* — Morgan, Lewis & Bockius LLP

(57) ABSTRACT

In various embodiments, a fluid is treated by flowing the fluid through a flow cell having (i) a fluid entry, (ii) a fluid exit, (iii) a treatment region disposed between the fluid entry and exit, and (iv) an interior surface reflective to ultraviolet (UV) light, and diffusively reflecting UV light emitted from one or more UV light sources to illuminate the treatment region substantially uniformly, thereby treating the fluid.

22 Claims, 10 Drawing Sheets

(56) References Cited

U.S. PATENT DOCUMENTS

| | | |
|---|---|---|
| 7,226,542 B2 | 6/2007 | Zemel et al. |
| 7,364,654 B2 | 4/2008 | Schulz |
| 7,419,642 B2 | 9/2008 | Fowler et al. |
| 7,427,763 B2 | 9/2008 | Rudkowski |
| 7,842,932 B2 | 11/2010 | Knight et al. |
| 7,977,660 B2 | 7/2011 | Potyrailo et al. |
| 7,985,956 B2 | 7/2011 | Fraser et al. |
| 8,343,437 B2 | 1/2013 | Patel |
| 8,388,850 B2 | 3/2013 | Delano |
| 8,507,874 B2 | 8/2013 | From et al. |
| 2002/0144955 A1* | 10/2002 | Barak et al. .................. 210/748 |
| 2004/0069954 A1 | 4/2004 | Traubenberg et al. |
| 2005/0000913 A1 | 1/2005 | Betterly |
| 2005/0136200 A1* | 6/2005 | Durell et al. ................. 428/35.7 |
| 2006/0163126 A1 | 7/2006 | Maiden |
| 2006/0181695 A1 | 8/2006 | Sage |
| 2007/0151905 A1 | 7/2007 | Wang et al. |
| 2007/0170121 A1 | 7/2007 | Mukaddam et al. |
| 2008/0105625 A1 | 5/2008 | Rosenberg et al. |
| 2008/0210608 A1 | 9/2008 | Abe et al. |
| 2009/0041632 A1 | 2/2009 | Day et al. |
| 2009/0294688 A1 | 12/2009 | Evans |
| 2010/0193421 A1 | 8/2010 | Ma et al. |
| 2010/0237254 A1 | 9/2010 | Mason et al. |
| 2010/0291502 A1* | 11/2010 | Knight ........................... 433/29 |
| 2010/0314551 A1 | 12/2010 | Bettles et al. |
| 2012/0097862 A1 | 4/2012 | Snowball |
| 2012/0168641 A1* | 7/2012 | Lizotte ......................... 250/435 |
| 2012/0248329 A1 | 10/2012 | From et al. |
| 2013/0025692 A1 | 1/2013 | Heide et al. |
| 2014/0061027 A1* | 3/2014 | Polwart et al. ............. 204/158.2 |

\* cited by examiner

DETECTOR IMAGE: INCOHERENT IRRADIANCE

DETECTOR IMAGE: INCOHERENT IRRADIANCE

SYSTEMS AND METHODS FOR FLUID TREATMENT WITH HOMOGENEOUS DISTRIBUTION OF ULTRAVIOLET LIGHT

RELATED APPLICATION

This application claims the benefit of and priority to U.S. Provisional Patent Application No. 61/871,630, filed Aug. 29, 2013, the entire disclosure of which is hereby incorporated herein by reference.

TECHNICAL FIELD

In various embodiments, the present invention relates to fluid treatment with ultraviolet (UV) radiation.

BACKGROUND

Liquids, including water, are commonly used for many domestic and industrial purposes such as drinking, food preparation, manufacturing, processing of chemicals, and cleansing. Often it is necessary to purify a liquid prior to its use. Filters such as ceramic filters are typically used to remove particulate and chemical impurities from liquids. In addition, a liquid can be exposed to UV radiation to neutralize microorganisms and deleterious pathogens that may be present in the liquid. Exposure to short wavelength (e.g., 100 nm-320 nm) UV radiation can have a germicidal effect, i.e., the radiation can disrupt the DNA of many cellular microorganisms—thereby virtually destroying them or rendering them substantially harmless. The exposure to UV radiation can also substantially prohibit the growth and/or reproduction of microorganisms that may be present in the liquid.

The germicidal effect of UV radiation on flowing liquid depends on the energy density of the UV radiation, i.e., the fluence of radiation, which in turn is related to the power of the radiation and the duration of exposure. The radiation power depends on the power supplied to the source of radiation, and the duration of exposure depends on the flow rate of the liquid. However, UV light emitted by LEDs typically has a Gaussian distribution of intensity that may not approximate the exposure volume of the fluid being disinfected. Thus, disinfection systems with such LEDs tend to have non-homogeneous distributions of UV intensity, which results in inefficient disinfection. That is, excess LED power may be required to achieve a desired fluence of radiation within the entire cross-section of the treatment system, even if such elevated power levels produce much more than a required level of fluence within particular areas of the system.

In addition, the power required to disinfect various liquids may require the use of more than one LED in the disinfection system. Although UV LEDs may in theory have lifetimes exceeding 10,000 hours or more, they do fail, and failure of one device in a multiple-LED system tends to result in further uneven distribution of UV irradiance and thus inefficient and/or insufficient disinfection.

In view of the foregoing, there is a need for fluid-treatment systems utilizing UV LEDs for disinfection that efficiently produce homogeneous levels of irradiance and that are robust even in the event of LED failure.

SUMMARY

In various embodiments of the present invention, a flowing fluid is exposed to UV radiation sufficient to have a desired germicidal effect, thereby substantially purifying the fluid, but without the energy waste exhibited by prior systems. Embodiments of the invention provide a flow cell in which the fluid is exposed to UV radiation having a substantially uniform distribution of intensity (i.e., as a function of area). In this manner, treatment efficacy is substantially uniform across the entire cross-sectional area of the treatment volume, i.e., the cell through which the fluid flows. Moreover, the substantially uniform intensity distribution ensures that substantially all liquid flowing through the cell is treated while not requiring excess power to operate the UV radiation source. That is, the irradiance of the UV radiation source may be maintained at a substantially uniform level just capable of achieving the desired germicidal effect, rather than, as in conventional systems generating non-uniform energy distributions, overexposing some areas so that other areas receive the minimum germicidal energy dose.

In preferred embodiments of the invention, the substantially uniform intensity distribution of UV radiation is enabled via the use of one or more highly diffusively reflective surfaces that effectively distribute UV light from only a few (or even just one) sources of UV light (e.g., point sources) such as LEDs and/or lasers. In general, the UV sources emit light into the flow cell through highly UV-transparent windows, and the UV light from the sources is diffusively reflected into the treatment zone with a high degree of resulting uniformity. The light from the UV sources is thus preferably at least initially reflected within the flow cell via highly diffuse reflection, rather than by, for example, specular reflection or total internal reflection (TIR). Since the diffuse reflection(s) reflect the light from the UV sources at many different angles, efficient distribution of the UV light is accomplished while minimizing the number of UV sources. Once the light is initially diffusively reflected within the flow-cell apparatus, it may be further reflected and/or distributed within the flow cell (e.g., within the treatment zone) via diffusive and/or specular reflection from one or more other surfaces. In this manner, even UV sources emitting radiation in a Gaussian distribution (e.g., UV LEDs) may be utilized to produce a substantially uniform intensity of UV radiation as a function of cross-sectional area of the treatment zone.

Since the UV sources themselves are typically disposed behind UV-transparent windows, rather than disposed within the treatment zone itself, replacement of defective or failed UV sources may be accomplished without disassembly of the entire flow cell apparatus. The UV sources are typically also positioned such that their emission surfaces (at least the primary emission surface from which most light is emitted) emit light without a direct line-of-sight to any of the other UV sources and/or the UV-transparent windows associated therewith. That is, most, or even substantially all, of the light emitted into the flow cell from one UV source is diffusively reflected by at least one surface before any appreciable portion of the light might be directed toward the UV-transparent window of another UV source. This arrangement thus minimizes or substantially eliminates loss of UV light from a UV source via leakage out of the flow cell through the UV-transparent windows of the other UV sources and/or via absorption by the other UV sources themselves. One or more of the UV sources may emit UV light with a Gaussian energy distribution.

As utilized herein, "diffusive" materials and surfaces exhibit at least 60% diffusive reflectivity to light, and in particular to UV light in at least a portion of the wavelength range of approximately 100 nm to approximately 320 nm. Preferred diffusive surfaces approach ideal Lambertian reflectance (i.e., 100% diffusive reflectivity) and exhibit at least 75%, at least 90%, at least 93%, or even at least 98% diffusive reflectivity to UV light in at least a portion of the wavelength range of approximately 100 nm to approximately 320 nm. (Similarly, "specular" materials and surfaces, as utilized herein, exhibit at least 60%, at least 75%, or even at least 90% specular reflectivity to light, and in particular to UV light in at least a portion of the wavelength range of approximately 100 nm to approximately 320 nm; such materials may include metals and/or metallic coatings, e.g., aluminum.) The diffusive material may be porous or semiporous, and/or may have a rough surface, in order to promote diffusive reflection therefrom.

The diffusive material (or at least the reflective surface thereof) may include or consist essentially of, for example, polytetrafluoroethylene (PTFE) such as Optical PTFE available from Berghof Fluoroplastic Technology GmbH of Eningen, Germany. Although PTFE has been utilized in conventional water sanitation due to its chemical and mechanical inertness, such conventional systems either do not utilize UV light for purification or utilize PTFE components that are sufficiently thin so as to allow the transmission of UV light through the components themselves. Preferred embodiments of the present invention utilize diffuse reflectors having thicknesses sufficient to prevent transmission of the purifying UV light through the reflective surfaces themselves, thus promoting substantially uniform illumination of the treatment zone via diffuse reflection without any substantial decrease in UV light intensity. For example, PTFE components utilized in embodiments of the present invention typically have thicknesses 1 mm or greater, 2 mm or greater, or even 5 mm or greater, whereas conventional transmissive PTFE components have thicknesses of a fraction of a millimeter or less. Because the diffusively reflective materials are at least substantially opaque (and thus not transmissive) to the UV light utilized in the flow cell, the flow cell incorporates a UV-transparent window for each UV source to allow light therefrom to enter the apparatus. Such windows may include or consist essentially of, for example, one or more materials substantially transparent to UV light in at least a portion of the wavelength range of approximately 100 nm to approximately 320 nm. Examples of such materials include quartz, fused silica, or sapphire.

Embodiments of the invention incorporate various features described in U.S. patent application Ser. No. 12/813,293, filed Jun. 10, 2010, the entire disclosure of which is incorporated by reference herein.

In an aspect, embodiments of the invention feature a fluid treatment system that includes or consists essentially of a flow cell for containing a flowing fluid in an interior thereof, a first end cap disposed at a first end of the flow cell, a second end cap disposed at a second end of the flow cell opposite the first end of the flow cell, a first window disposed between the flow cell and the first end cap, a second window disposed between the flow cell and the second end cap, one or more first UV light sources positioned to emit UV light into the first end cap, and one or more second UV light sources positioned to emit UV light into the second end cap. The flow cell has (i) a fluid entry, (ii) a fluid exit, (iii) a treatment region disposed between and fluidically coupled to the fluid entry and exit, and (iv) an interior surface diffusively reflective to ultraviolet (UV) light. The first end cap and second end cap each have one or more sidewalls diffusively reflective to UV light. The first window substantially prevents fluid flow into the first end cap and is substantially transparent to UV light. The second window substantially prevents fluid flow into the second end cap and is substantially transparent to UV light. The sidewall of the first end cap is configured (e.g., sized, shaped, and/or angled) to diffusively reflect at least a portion of the UV light into the treatment region. The sidewall of the second end cap is configured to (e.g., sized, shaped, and/or angled) diffusively reflect at least a portion of the UV light into the treatment region.

Embodiments of the invention may include one or more of the following in any of a variety of combinations. A third window may be disposed between one or more (or even each) of the one or more first UV light sources and an interior of the first end cap. Each third window may be disposed within the sidewall of the first end cap and substantially transparent to UV light. A fourth window disposed between one or more (or even each) of the one or more second UV light sources and an interior of the second end cap. Each fourth window may be disposed within the sidewall of the second end cap and substantially transparent to UV light. One or more third UV light sources may be positioned to emit UV light directly into the treatment zone (e.g., from a sidewall of the flow cell and/or the treatment zone). The UV light from the one or more third UV light sources may be diffusively reflected by the interior surface of the flow cell. A fifth window may be disposed between one or more (or even each) of the third UV light sources and the treatment zone. Each fifth window may be disposed within a sidewall of the treatment zone and substantially transparent to UV light.

The first end cap may be shaped as a truncated cone with a substantially planar end surface disposed away from the treatment zone, and an area of the end surface of the first end cap may be smaller than an area of the first window. The end surface of the first end cap may be diffusively reflective to UV light or specularly reflective to UV light. The second end cap may be shaped as a truncated cone with a substantially planar end surface disposed away from the treatment zone, and an area of the end surface of the second end cap may be smaller than an area of the second window. The end surface of the second end cap may be diffusively reflective to UV light or specularly reflective to UV light. One or more (or even each) of the first and/or second UV light sources may include or consist essentially of a light-emitting diode. UV light from the one or more first UV light sources and the one or more second UV light sources may illuminate the treatment zone substantially uniformly. UV light from the one or more first UV light sources and the one or more second UV light sources may illuminate a volume disposed between the first and second windows substantially uniformly. The perimeter of the flow cell substantially perpendicular to a flow direction between the fluid entry and the fluid exit may be substantially circular. The perimeter of the flow cell substantially perpendicular to a flow direction between the fluid entry and the fluid exit may define an n-sided polygon, where n=3 to 18. The perimeter of the flow cell substantially perpendicular to a flow direction between the fluid entry and the fluid exit may be substantially hexagonal. The perimeter of the first and/or second end caps may be substantially circular. The perimeter of the first and/or second end caps may define an n-sided polygon, where n=3 to 18. The perimeter of the first and/or second end caps may be substantially hexagonal.

The interior surface of the flow cell, the sidewall of the first end cap, and/or the sidewall of the second end cap may include, consist essentially of, or consist of polytetrafluoroethylene having a thickness of 1 mm or greater. The flow cell (at least in the treatment region), the first end cap, and/or the second end cap may include, consist essentially of, or consist of polytetrafluoroethylene having a thickness of 1 mm or greater. The thickness of the polytetrafluoroethylene may be selected from the range of 1 mm to 10 mm. The first window and/or the second window may include, consist essentially of, or consist of quartz, fused silica, and/or sapphire. The first and/or second end caps may be shaped as (i) a cone with a tip disposed away from the treatment zone, or (ii) a cylinder having a planar end surface disposed away from the treatment zone. The flow cell may include or consist essentially of an oblong tube. The fluid entry and fluid exit may be disposed at opposite ends of the tube. The fluid entry and fluid exit may be positioned such that fluid flow therethrough is approximately perpendicular to fluid flow through the treatment region.

In another aspect, embodiments of the invention feature a fluid treatment system that includes or consists essentially of a flow cell for containing a flowing fluid in an interior thereof, one or more first UV light sources positioned to emit UV light toward a first interior surface of the fluid treatment system, and a first window disposed between one or more (or even each) of the one or more first UV light sources and the treatment region. The flow cell has (i) a fluid entry, (ii) a fluid exit, (iii) a treatment region disposed between the fluid entry and exit, and (iv) an interior surface reflective to ultraviolet (UV) light. The first interior surface is diffusively reflective to UV light and configured (e.g., sized, shaped, and/or angled) to diffusively reflect at least a portion of the UV light into the treatment region. Each first window is substantially transparent to UV light.

Embodiments of the invention may include one or more of the following in any of a variety of combinations. The interior surface of the flow cell may be diffusively reflective to UV light, the first interior surface of the fluid treatment system may be a portion of the interior surface of the flow cell, and/or each first window may be disposed within a sidewall of the flow cell. The flow cell may have a first end surface proximate the fluid entry and a second end surface proximate the fluid exit. The first and second end surfaces may be diffusively reflective to UV light or specularly reflective to UV light. The interior surface of the flow cell (or even the flow cell itself, at least in the treatment region) may include, consist essentially of, or consist of polytetrafluoroethylene having a thickness of 1 mm or greater. The thickness of the polytetrafluoroethylene may be selected from the range of 1 mm to 10 mm. One or more (or even each) first window may include, consist essentially of, or consist of quartz, fused silica, and/or sapphire.

The perimeter of the flow cell substantially perpendicular to a flow direction between the fluid entry and the fluid exit may be substantially circular. The perimeter of the flow cell substantially perpendicular to a flow direction between the fluid entry and the fluid exit may define an n-sided polygon, where n=3 to 18. The perimeter of the flow cell substantially perpendicular to a flow direction between the fluid entry and the fluid exit may be substantially hexagonal. A first end cap may be disposed at a first end of the flow cell. The first end cap may have a sidewall diffusively reflective to UV light.

The first interior surface of the fluid treatment system may include, consist essentially of, or consist of at least a portion of the sidewall of the first end cap. At least one of the first windows may be disposed within the sidewall of the first end cap. A second end cap may be disposed at a second end of the flow cell opposite the first end of the flow cell. The second end cap may have a sidewall diffusively reflective to UV light. The first interior surface of the fluid treatment system may include, consist essentially of, or consist of at least a portion of the sidewall of the second end cap. At least one of the first windows may be disposed within the sidewall of the second end cap. The sidewall (or even the entirety) of the first and/or second end caps may include, consist essentially of, or consist of polytetrafluoroethylene having a thickness of 1 mm or greater. The thickness of the polytetrafluoroethylene may be selected from the range of 1 mm to 10 mm. A second window may be disposed between the second end cap and the treatment region. The second window may substantially prevent fluid flow into the second end cap and/or be substantially transparent to UV light. A second window may be disposed between the first end cap and the treatment region. The second window may substantially prevent fluid flow into the first end cap and/or be substantially transparent to UV light. At least one (and even each) first UV light source may include or consist essentially of a light-emitting diode. UV light from the one or more first UV light sources may illuminate the treatment zone substantially uniformly.

In yet another aspect, embodiments of the invention feature a method for treating fluid. Fluid is flowed through a flow cell having (i) a fluid entry, (ii) a fluid exit, (iii) a treatment region disposed between the fluid entry and exit, and (iv) an interior surface reflective to ultraviolet (UV) light. UV light emitted from one or more UV light sources is diffusively reflected to illuminate the treatment region substantially uniformly, thereby treating the fluid flowing through the treatment region.

Embodiments of the invention may include one or more of the following in any of a variety of combinations. Some of the UV light may be specularly reflected in addition to or instead of being diffusively reflected. At least one UV light source may emit UV light into an end cap substantially isolated from the fluid. The end cap may diffusively reflect at least a portion of the UV light into the treatment region. The interior surface of the flow cell may be specularly reflective to UV light or diffusively reflective to UV light. The UV light may be diffusively reflected from a surface including, consisting essentially of, or consisting of polytetrafluoroethylene having a thickness of 1 mm or greater. The thickness of the polytetrafluoroethylene may be selected from the range of 1 mm to 10 mm. One or more UV light sources may be disposed outside of the flow cell and separated from the flow cell by one or more windows. The one or more windows may be substantially transparent to UV light.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the term "substantially" means ±10%, and in some embodiments, ±5%. The term "consists essentially of" means excluding other materials that contribute to function, unless otherwise defined herein. Nonetheless, such other materials may be present, collectively or individually, in trace amounts. Herein, the terms "radiation" and "light" are utilized interchangeably unless otherwise indicated.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
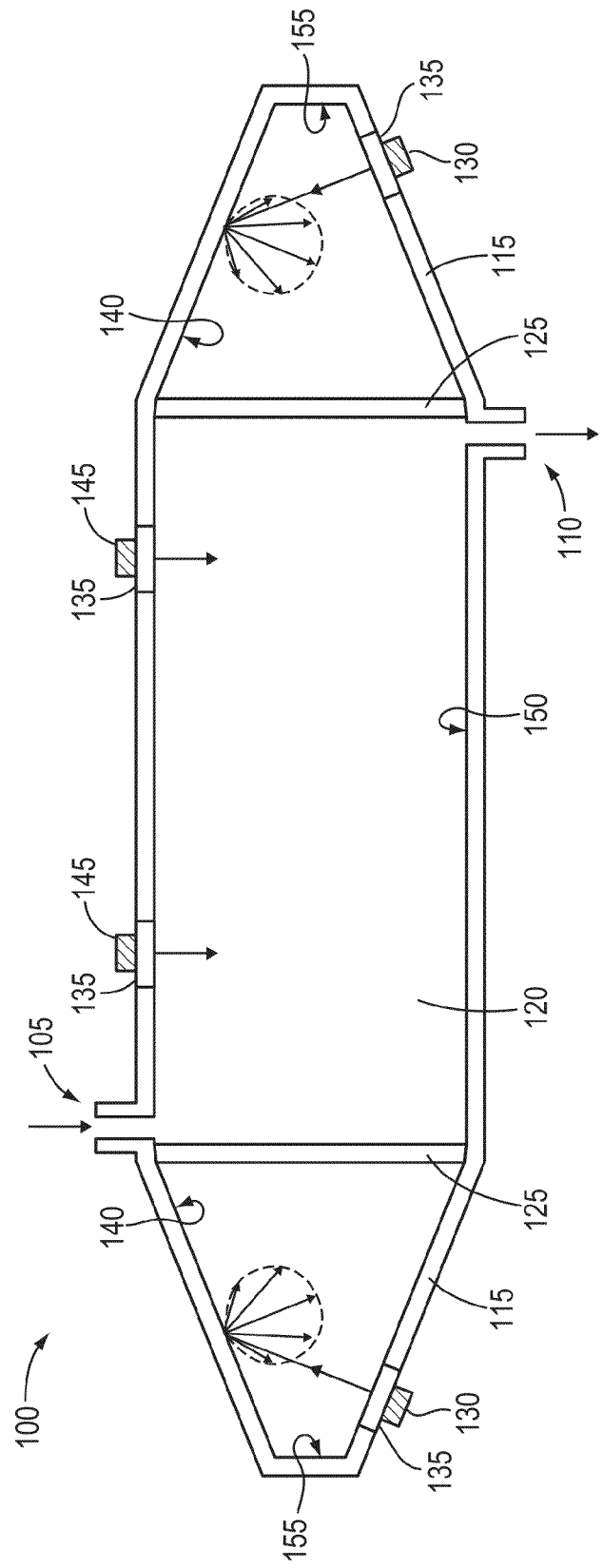
FIG. 1 is a cross-sectional schematic of an apparatus for the purification of fluid via UV irradiation in accordance with various embodiments of the invention.

FIG. 1 depicts an exemplary purification apparatus 100 in accordance with various embodiments of the present invention. As shown, the apparatus 100 features a fluid inlet 105, a fluid outlet 110, two end caps 115, a flow cell 120, and a UV-transparent window 125 separating each end cap 115 from the flow cell 120. One or more UV light sources 130 (e.g., UV LEDs and/or lasers) emit UV light having a wavelength between approximately 100 nm and approximately 320 nm into each of the end caps 115 through UV-transparent windows 135. The end caps 115 may include or consist essentially of a diffusive material, and thus at least a sidewall 140 of each end cap 115 is diffusive to the UV light from the light sources 130. Thus, as shown, the light from each light source 130 strikes the sidewall 140 and is diffusely reflected over a wide range of angles, thereby distributing the light over a large volume. As a consequence, when the UV light enters the flow cell 120 through the UV-transparent windows 125, the flow cell 120 is illuminated with a high degree of uniformity.

Fluid (e.g., liquid water) flowing from the inlet 105 to the outlet 110 is irradiated, and thus substantially disinfected, by the uniformly distributed light within the flow cell 120. Because the light is distributed via diffuse reflection and is therefore highly uniformly irradiating the flow cell 120, the minimum level of irradiance (for, e.g., the germicidal or disinfecting effect desired) is achieved throughout the flow cell 120 while the overall energy level (i.e., the level of energy consumption required to power the light sources 130) is minimized. That is, the minimum level of irradiance is achieved without the need to irradiate portions of the flow cell 120 at higher levels in order to compensate for any "dark volumes" lacking in sufficient reflected light. As demonstrated in more detail below, the light distribution by diffuse reflection in accordance with embodiments of the present invention advantageously achieves a minimum level of irradiance with higher levels of uniformity, particularly when compared with apparatuses employing specular reflectance and/or TIR. Thus, embodiments of the present invention provide beneficial germicidal and/or disinfecting effects while utilizing fewer light sources and/or less power consumption thereby when compared to conventional solutions.

While FIG. 1 depicts only one light source 130 emitting light into each end cap 115, other embodiments of the invention incorporate multiple light sources 130 emitting light into each end cap 115. Each light source 130 may emit light through a different UV-transparent window 135 disposed within the end cap 115, or two or more light sources 130 may each emit light into the end cap 115 through a single, shared UV-transparent window 135. Preferably the light sources 130 are positioned such that their primary direction of light emission (e.g., the direction of emission from a primary emission surface) is not directly toward another light source 130 or another UV-transparent window 135. That is, the light from each light source 130 will tend to diffusively reflect from sidewall 140 (and/or another diffusive surface in apparatus 100) at least once before a portion of the light might be directed toward another light source 130 or another UV-transparent window 135. This arrangement maximizes the distribution of the UV light within the apparatus 100 while minimizing or reducing the amount of light (if any) lost via absorption by a light source 130 and/or transmission out of apparatus 100 through a UV-transparent window 135.

As shown in FIG. 1, the apparatus 100 may also feature one or more light sources 145 (e.g., point sources such as LEDs and/or lasers) emitting UV light directly into the flow cell 120 via UV-transparent windows 135, thereby augmenting the amount of UV light within the flow cell 120. In other embodiments, the light sources 145 and their respective UV-transparent windows 135 are omitted, and the only light distributed within the flow cell 120 is emitted into the flow cell 120 from one or more end caps 115. In embodiments in which light sources 145 are present, preferably at least the interior surface 150 of the flow cell 120 opposite each of the light sources 145 is diffusive to promote uniform redistribution of the light within the flow cell 120. In embodiments in which light sources 145 are omitted, the interior surface of the flow cell 120 is preferably diffusive, but may be specular—since preferred embodiments of the invention uniformly distribute UV light within the end caps 115 before the light even enters the flow cell 120, the light may be substantially specularly reflected within the flow cell 120 itself without reducing the disinfection efficacy of apparatus 100. In embodiments of the invention in which surface 150 (and or other surfaces of apparatus 100) is specular, the portion of the apparatus 100 at the surface may include or consist essentially of the diffusive material with an inner coating of a specular material (e.g., a metal such as aluminum) thereon.

Figure 2:
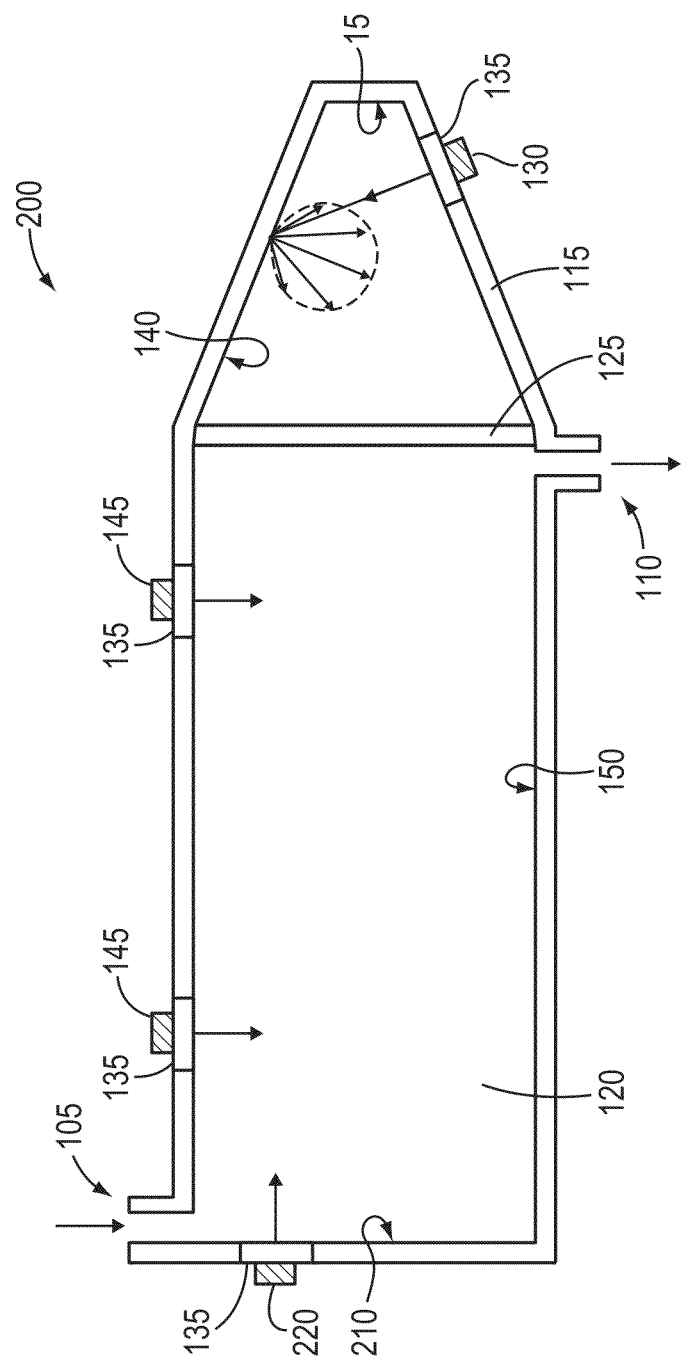
FIG. 2 is a cross-sectional schematic of an apparatus for the purification of fluid via UV irradiation in accordance with various embodiments of the invention.

FIG. 1 depicts an apparatus 100 with two frusto-conical end caps 115, but various embodiments of the invention feature only one end cap 115. FIG. 2 depicts one such exemplary apparatus 200. In such embodiments, a UV-transparent window 125 may still be disposed proximate the end cap 115 while the other UV-transparent window 125 may be omitted. An interior surface 210 of the apparatus 200 opposite the single end cap 115 is preferably diffusive, but in some embodiments may be specular. As shown, the apparatus 200 with only a single end cap 115 may feature one or more light sources 145 emitting UV light directly into flow cell 120 via windows 135, but in other embodiments of the invention the light sources 145 (and their respective windows 135) are omitted, and UV light within the flow cell 120 originates only from the end cap 115. In some embodiments, as shown in FIG. 2, one or more light sources 220 may emit UV light into the flow cell 120 through a window 135 disposed in the surface 210. As mentioned previously, such light sources (and all others within a particular apparatus) preferably do not directly face other light sources, and the light therefrom is preferably diffusely reflected at least once before possibly being directed toward a light source or a window 135.

Figure 3:
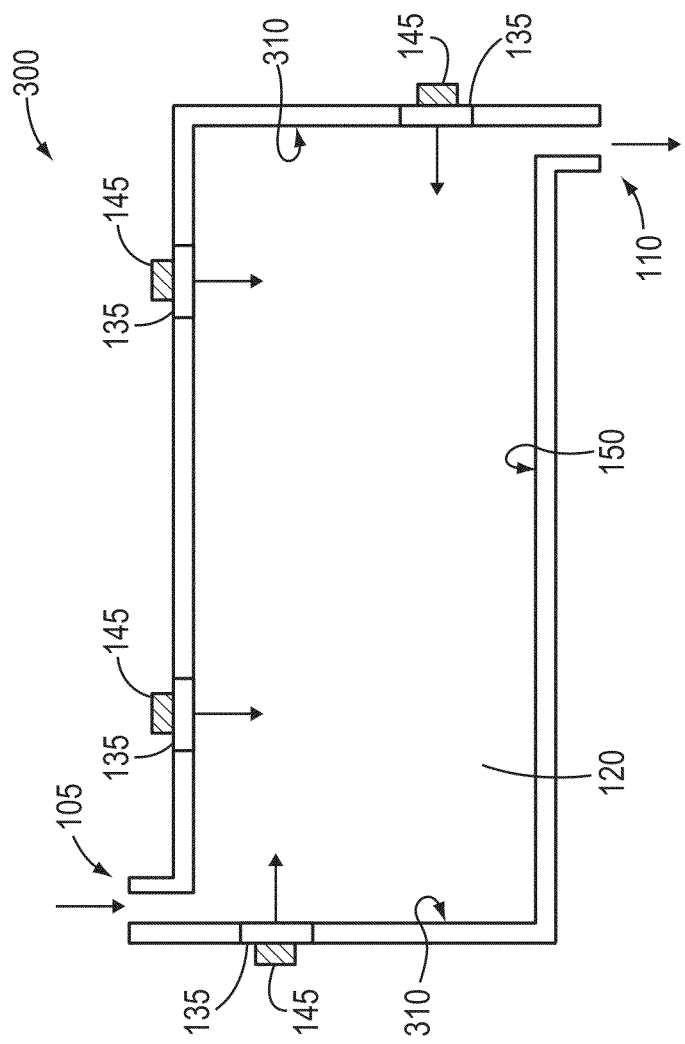
FIG. 3 is a cross-sectional schematic of an apparatus for the purification of fluid via UV irradiation in accordance with various embodiments of the invention.

Some embodiments of the invention omit end caps 115 altogether, and one or more light sources 145 emitting light directly into the flow cell 120 are the only source of illumination. FIG. 3 depicts one such exemplary apparatus 300. In such embodiments, the entire interior surface of the flow cell 120, including the end surfaces 310, is preferably diffusive, although in some embodiments one or both end surfaces 310 are specular. As shown in FIG. 3, one or more light sources 145 may emit light into the flow cell 120 via windows 135 disposed in one or both end surfaces 310, although in preferred embodiments such light sources 145 are only disposed at one end surface 310 or such light sources 145 do not directly face each other, thereby facilitating at least one diffusive reflection of light emitted thereby before such light is directed toward another light source and/or window 135. In embodiments in which light source(s) 145 emit through one or both end surfaces 310, the end surface(s) 310 facing such light sources 145 is preferably diffusive, rather than specular, to facilitate uniform redistribution of light emitted by the light sources 145 within the flow cell 120.

Figure 4A:
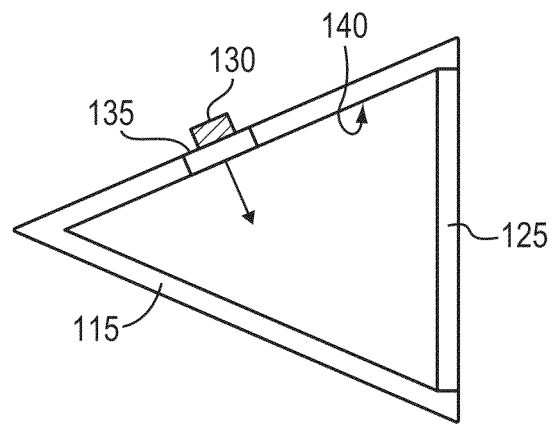
FIGS. 4A and 4B are cross-sectional schematics of end caps for apparatuses for the purification of fluid via UV irradiation in accordance with various embodiments of the invention.
Figure 4B:
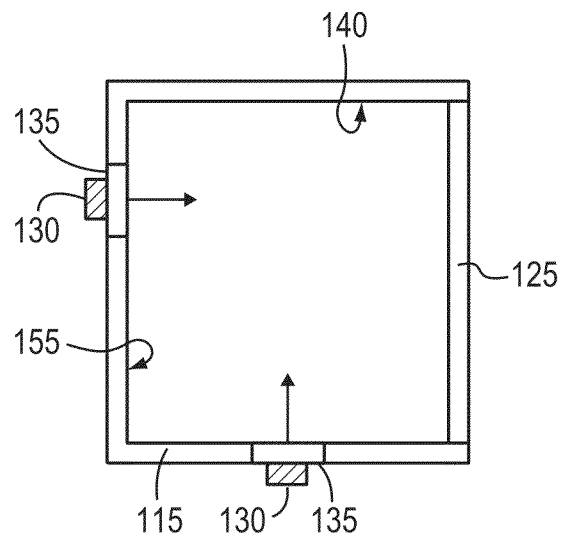

Although FIGS. 1 and 2 depict the end caps 115 as truncated cones, in other embodiments one or more of the end caps 115 may alternatively be conical or cylindrical, as shown in FIGS. 4A and 4B respectively. In various embodiments, the apparatus 100 features two end caps 115 that each have a different shape and/or number of light sources 130 emitting light into the end cap 115. When the end caps 115 are truncated cones (or cylinders), an end surface 155 of each end cap 115 may be diffusive or specular. In some embodiments of the invention, one or more light sources 130 emit light through windows 135 disposed within the end surface 155, as shown in FIG. 4B. Such embodiments preferably feature light sources 130 emitting through only one end surface 155, while the opposite end surface 155 is diffusive to efficiently redistribute the light while minimizing the amount of light reflected back toward the light source(s) 130.

Figure 5A:
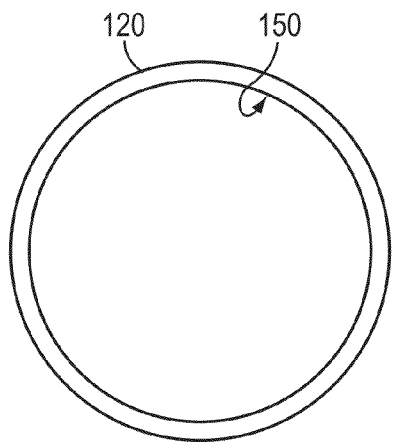
FIGS. 5A and 5B are cross-sectional schematics of flow cells for apparatuses for the purification of fluid via UV irradiation in accordance with various embodiments of the invention.
Figure 5B:
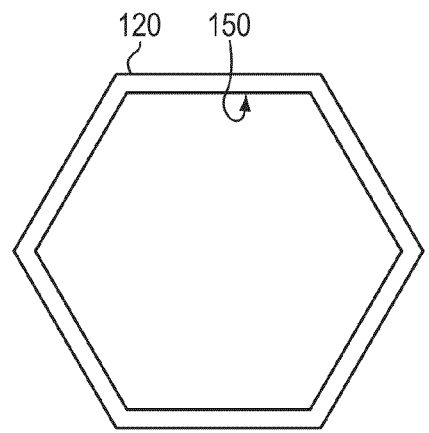
Figure 6A:
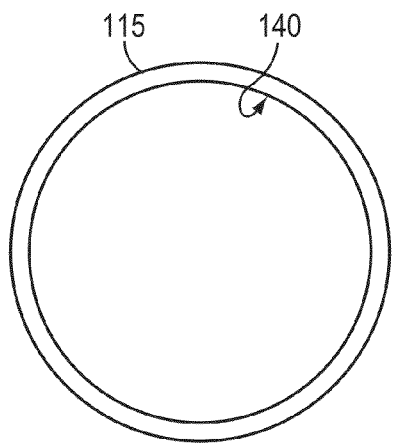
FIGS. 6A and 6B are cross-sectional schematics of end caps for apparatuses for the purification of fluid via UV irradiation in accordance with various embodiments of the invention.
Figure 6B:
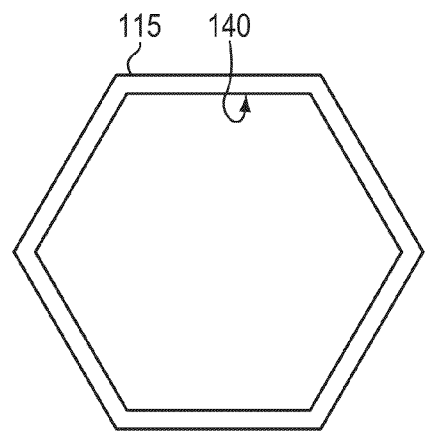

As shown in FIG. 5A, the flow cell 120 may have a circular cross-sectional shape. However, in other embodiments, as shown in FIG. 5B, the flow cell 120 has a non-circular polygonal cross-section. For example, the cross-section of flow cell 120 may be an n-sided polygon, where n ranges from 3 (i.e., a triangle) to 18. In various embodiments, n is 4 (i.e., a square), 6 (i.e., a hexagon, as shown in FIG. 5B), 12, or 18. Similarly, as shown in FIG. 6A, one or more end caps 115 may have a circular cross-sectional shape. However, in other embodiments, as shown in FIG. 6B, the end cap 115 has a non-circular polygonal cross-section. For example, the cross-section of end cap 115 may be an n-sided polygon, where n ranges from 3 (i.e., a triangle) to 18. In various embodiments, n is 4 (i.e., a square), 6 (i.e., a hexagon, as shown in FIG. 6B), 12, or 18. In some embodiments of the invention, the use of a flow cell 120 and/or one or more end caps 115 with a non-circular polygonal cross-section promotes uniform distribution of diffusively reflected light within a smaller volume (when compared to, e.g., components with circular cross-sections).

Figure 7:
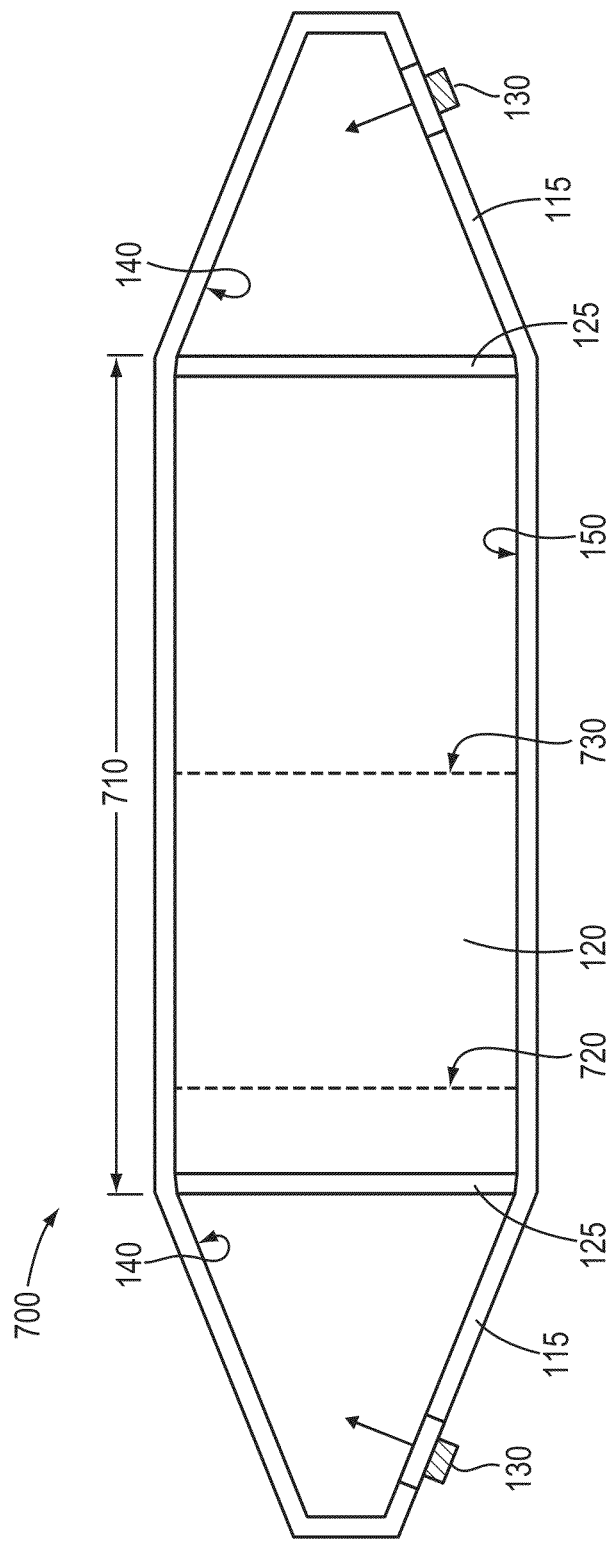
FIG. 7 is a cross-sectional schematic of a model of an apparatus for the purification of fluid via UV irradiation in accordance with various embodiments of the invention.

As mentioned previously, because embodiments of the present invention redistribute UV light within the flow cell via one or more diffusive reflections, such embodiments more efficiently achieve a minimum desired level of irradiance (or, equivalently, achieve a larger minimum level of irradiance for the same input power) than do UV-disinfecting solutions utilizing exclusively specular reflectance and/or TIR, even when the size and shape of the apparatus is substantially identical. A series of simulations was performed in order to demonstrate this superior performance of UV light confined by diffuse reflection compared with pure specular reflection and/or TIR. FIG. 7 is a schematic of an apparatus 700, which greatly resembles apparatus 100, utilized for the simulations. For the simulations, a flow cell 120 with a total length 710 of 150 mm was utilized, and the irradiance levels within the flow cell 120 at (1) a point 720 approximately 1 mm from one of the UV-transparent windows 125 and (2) a point 730 at the approximate mid-point within flow cell 120 (i.e., approximately 75 mm from each of the windows 125) were simulated. The flow cell 120 was assumed to have a circular cross-section with a diameter of 60 mm. Apparatus 700 incorporates one 60 mW UV LED emitting UV light into each end cap 115. For one set of simulations, the surfaces 140 of the end caps 115 and surface 150 of the flow cell 120 were assumed to be PTFE with 90% diffuse reflectance. For comparative purposes, another set of simulations assumed that surfaces 140, 150 were completely specular (or confined light via TIR).

Figure 8A:
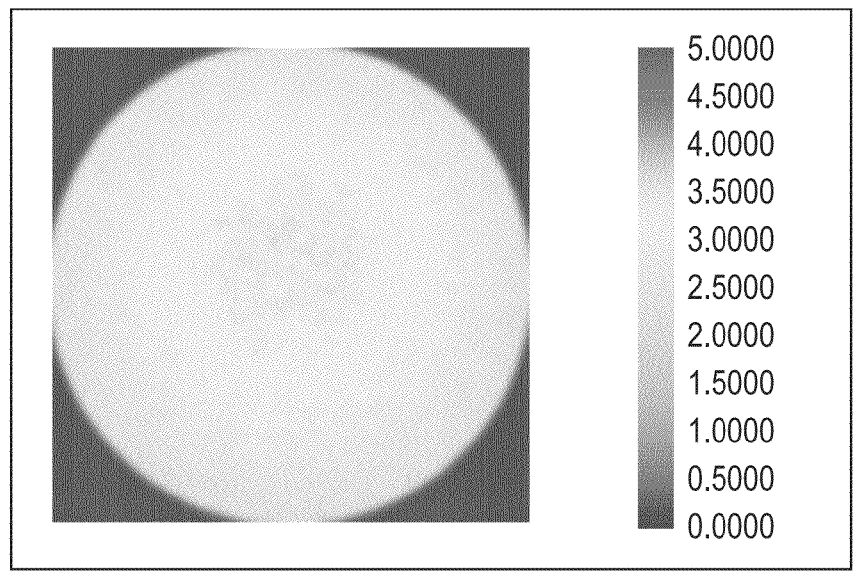
FIGS. 8A and 8B are plots of irradiance level as a function of position within the modeled apparatus of FIG. 7 with light being diffusively reflected in accordance with various embodiments of the invention.
Figure 8B:
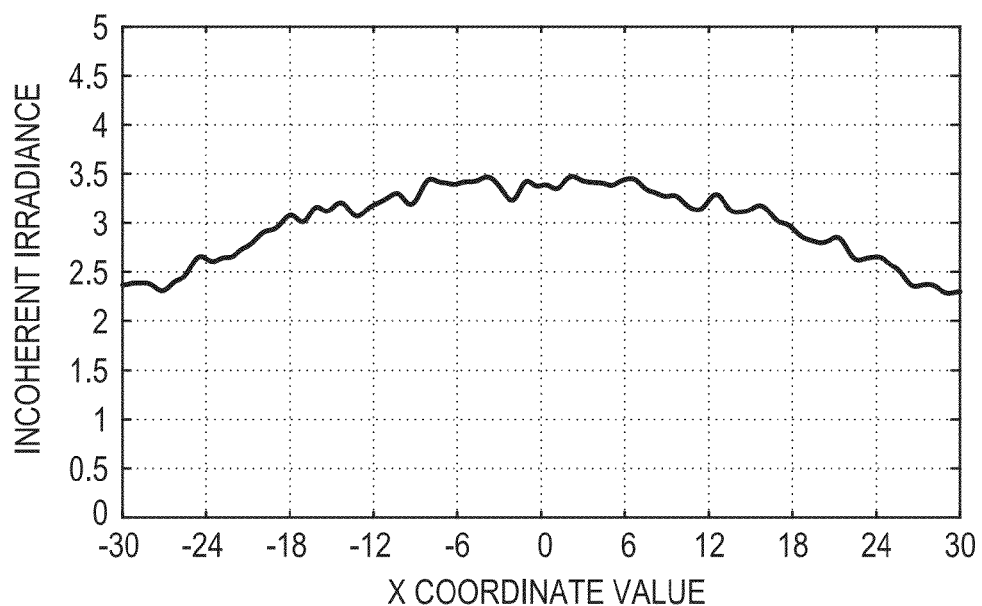
Figure 9A:
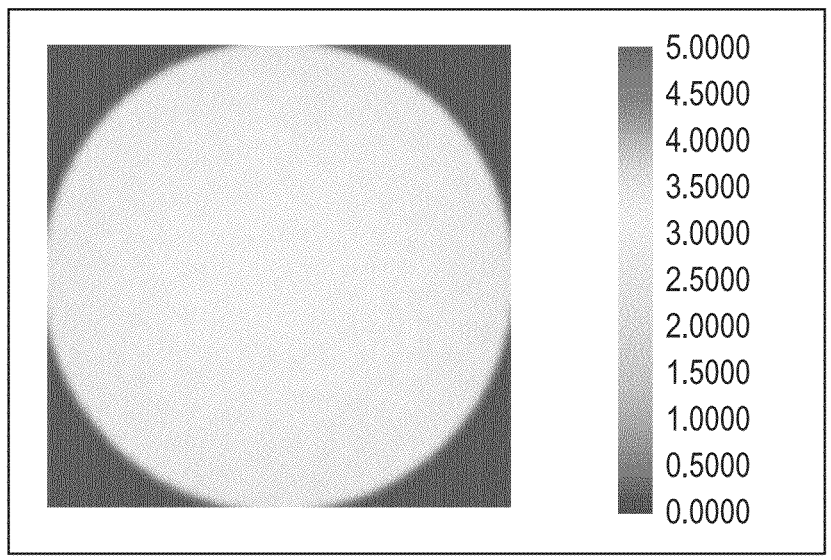
FIGS. 9A and 9B are plots of irradiance level as a function of position within the modeled apparatus of FIG. 7 with light being diffusively reflected in accordance with various embodiments of the invention.
Figure 9B:
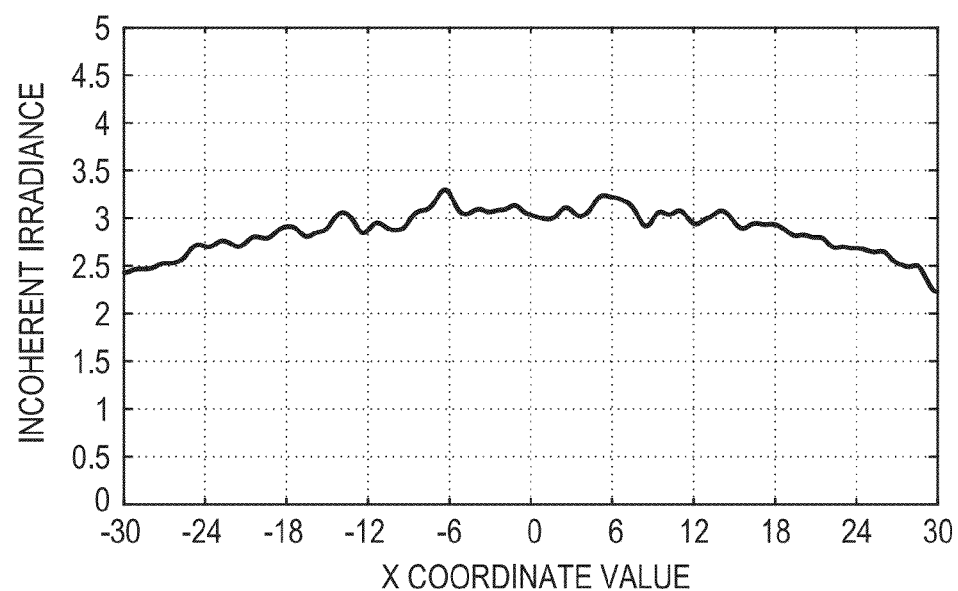

FIG. 8A is a plot of the UV irradiance level over the circular cross-section of flow cell 120 at point 720 for the diffusively reflective apparatus 700, and FIG. 8B is a graph of the irradiance level as a function of distance across the flow cell 120 at point 720 through the center of the circular cross-section of the same diffusively reflective apparatus 700. As shown, the irradiance is highly uniform across the cross-section of the flow cell 120, even at this small distance away from one of the end caps 115. The peak irradiance is approximately 3.6 mW/cm$^2$, while the minimum irradiance is approximately 2.4 mW/cm$^2$. FIGS. 9A and 9B are the equivalent graphs for the diffusively reflective apparatus 700 at point 730 in the center of the flow cell 120. As shown, the irradiance remains highly uniform across the cross-section of the flow cell 120. The peak irradiance is approximately 3.36 mW/cm$^2$, while the minimum irradiance is approximately 2.4 mW/cm$^2$.

Figure 10A:
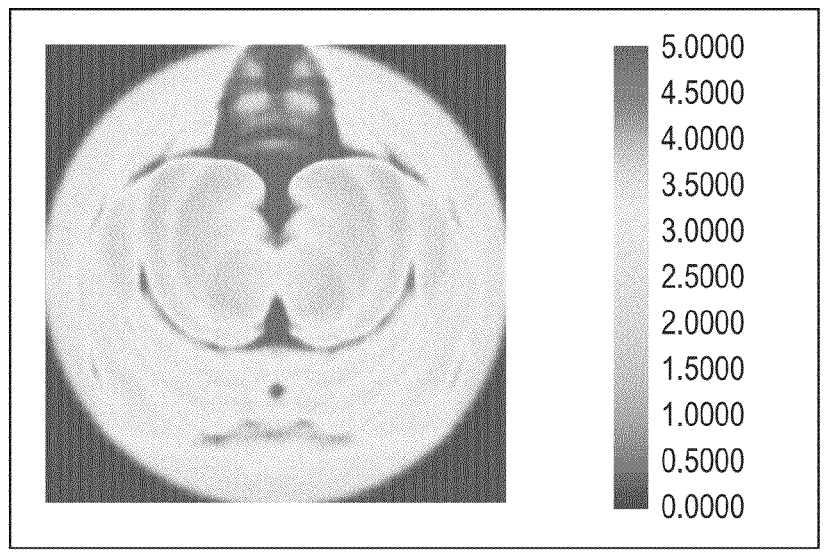
FIGS. 10A and 10B are plots of irradiance level as a function of position within the modeled apparatus of FIG. 7 with light being confined by total internal reflection.
Figure 10B:
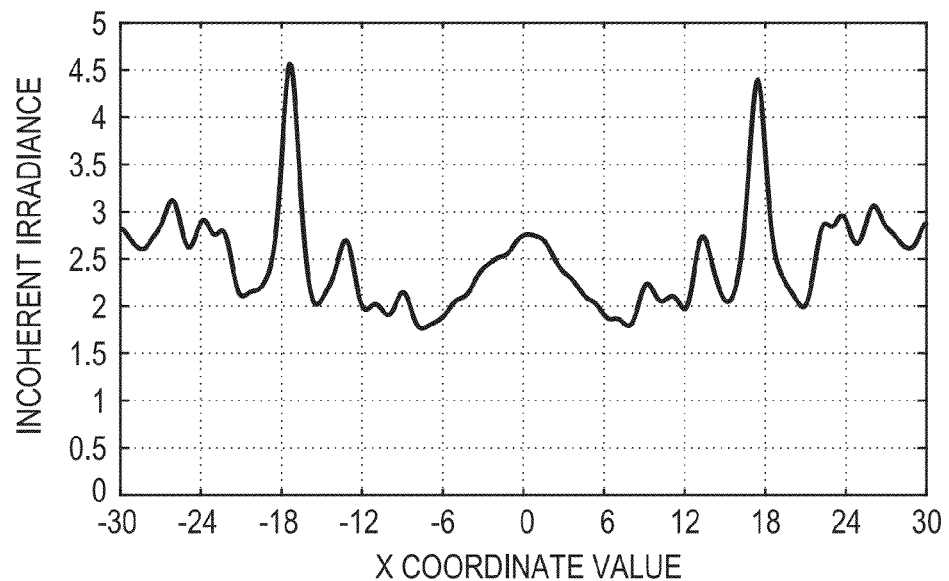
Figure 11A:
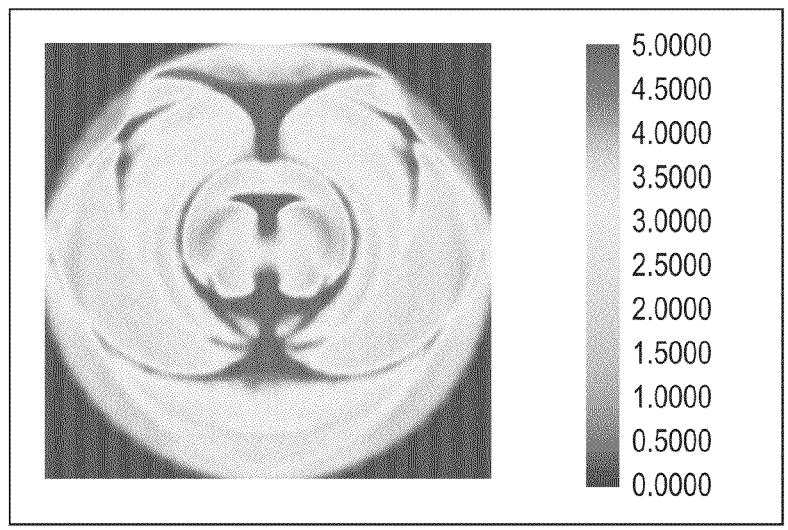
FIGS. 11A and 11B are plots of irradiance level as a function of position within the modeled apparatus of FIG. 7 with light being confined by total internal reflection.
Figure 11B:
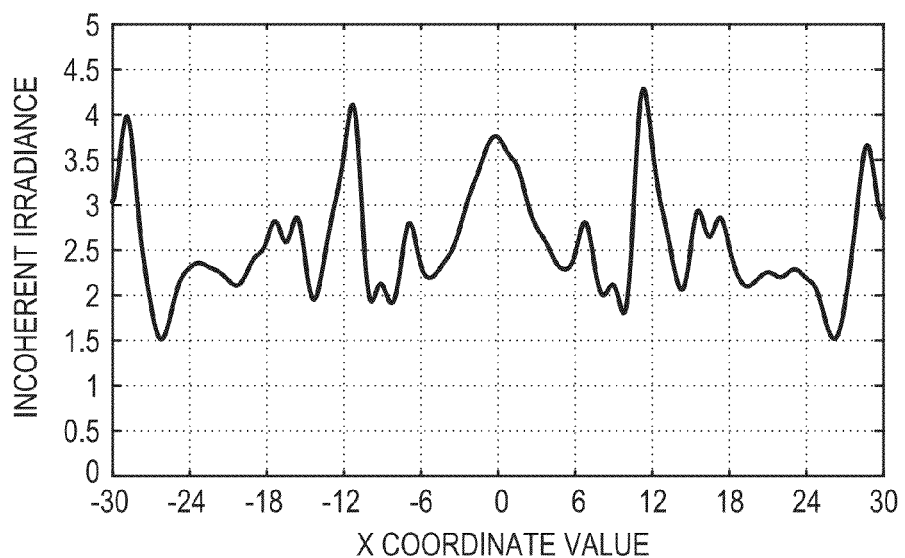

FIG. 10A is a plot of the UV irradiance level over the circular cross-section of flow cell 120 at point 720 for the apparatus 700 confining light by TIR, and FIG. 10B is a graph of the irradiance level as a function of distance across the flow cell 120 at point 720 through the center of the circular cross-section of the same apparatus 700 that confines light by TIR. As shown, the irradiance is much less uniform across the cross-section of the flow cell 120 when compared to the graphs of FIGS. 8A and 8B. The peak irradiance is approximately 4.6 mW/cm$^2$, while the minimum irradiance is approximately 1.8 mW/cm$^2$. FIGS. 11A and 11B are the equivalent graphs for the apparatus 700 confining light by TIR at point 730 in the center of the flow cell 120. As shown, the irradiance is again highly non-uniform across the cross-section of the flow cell 120. The peak irradiance is approximately 4.3 mW/cm$^2$, while the minimum irradiance is approximately 1.5 mW/cm$^2$.

The table below summarizes the improvement in minimum irradiance, for constant input power, exhibited by the diffusively reflecting apparatus 700 at points 720 and 730 compared to the apparatus 700 that confines light by TIR. As indicated, the diffusively reflecting apparatus 700 exhibits between 33% and 60% improvement in minimum irradiance. Thus, less input power is required to reach any particular minimum irradiance level in an apparatus in accordance with embodiments of the present invention due to the highly uniform distribution of UV light enabled by the diffuse reflectivity.

|  | Minimum Irradiance (TIR) | Minimum Irradiance (Diffusive Reflection) | Improvement |
| --- | --- | --- | --- |
| Point 720 | 1.8 | 2.4 | 33% |
| Point 730 | 1.5 | 2.4 | 60% |

The table below demonstrates the improvement in uniformity of irradiance due to the diffusive reflectivity of embodiments of the present invention by comparing the standard deviations of the irradiance levels shown in FIGS. 8A-11B. As indicated, the diffusively reflecting apparatus 700 exhibits between 21% and 24% improvement in uniformity of irradiance. Thus, less input power is wasted by irradiating portions of the flow cell at levels far exceeding the minimum desired irradiance level in an apparatus in accordance with embodiments of the present invention due to the highly uniform distribution of UV light enabled by the diffuse reflectivity.

|  | Std. Dev. of Irradiance (TIR) | Std. Dev. of Irradiance (Diffusive Reflection) | Improvement |
| --- | --- | --- | --- |
| Point 720 | 1.83 | 1.44 | 21% |
| Point 730 | 1.85 | 1.40 | 24% |

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A fluid treatment system comprising:
    a flow cell for containing a flowing fluid in an interior thereof, the flow cell having (i) a fluid entry, (ii) a fluid exit, (iii) a treatment region disposed between and fluidically coupled to the fluid entry and exit, and (iv) an interior surface diffusively reflective to ultraviolet (UV) light;
    a first end cap disposed at a first end of the flow cell and gaplessly joined to the flow cell, the first end cap having a sidewall diffusively reflective to UV light;
    a second end cap disposed at a second end of the flow cell opposite the first end of the flow cell and gaplessly joined to the flow cell, the second end cap having a sidewall diffusively reflective to UV light;
    a first window disposed between the flow cell and the first end cap, the first window (i) substantially preventing fluid flow into the first end cap and (ii) being substantially transparent to UV light;
    a second window disposed between the flow cell and the second end cap, the second window (i) substantially preventing fluid flow into the second end cap and (ii) being substantially transparent to UV light;
    one or more first UV light sources disposed outside of the first end cap and positioned to emit UV light into the first end cap, the sidewall of the first end cap being configured to diffusively reflect at least a portion of the UV light into the treatment region;
    one or more second UV light sources disposed outside of the second end cap and positioned to emit UV light into the second end cap, the sidewall of the second end cap being configured to diffusively reflect at least a portion of the UV light into the treatment region;
    a third window disposed between each of the one or more first UV light sources and an interior of the first end cap, each third window being (i) associated with a first UV light source, (ii) disposed within the sidewall of the first end cap, and (iii) substantially transparent to UV light; and
    a fourth window disposed between each of the one or more second UV light sources and an interior of the second end cap, each fourth window being (i) associated with a second UV light source, (ii) disposed within the sidewall of the second end cap, and (iii) substantially transparent to UV light,
    wherein:
        each first UV light source is positioned to (i) emit UV light through its associated third window for reflection from the sidewall of the first end cap, and (ii) emit substantially no UV light that exits the interior of the first end cap prior to diffuse reflection from the sidewall of the first end cap;
        each second UV light source is positioned to (i) emit UV light through its associated fourth window for reflection from the sidewall of the second end cap, and (ii) emit substantially no UV light that exits the interior of the second end cap prior to diffuse reflection from the sidewall of the second end cap; and
        UV light exiting the interiors of the first and second end caps illuminates the treatment zone substantially uniformly.
2. The fluid treatment system of claim 1, further comprising one or more third UV light sources positioned to emit UV light directly into the treatment zone, the UV light being diffusively reflected by the interior surface of the flow cell.
3. The fluid treatment system of claim 2, further comprising a fifth window disposed between each of the third UV light sources and the treatment zone, each fifth window being (i) disposed within a sidewall of the treatment zone and (ii) substantially transparent to UV light.
4. The fluid treatment system of claim 1, wherein the first end cap is shaped as a truncated cone with a substantially planar end surface disposed away from the treatment zone, an area of the end surface of the first end cap being smaller than an area of the first window.
5. The fluid treatment system of claim 4, wherein the end surface of the first end cap is diffusively reflective to UV light.
6. The fluid treatment system of claim 4, wherein the end surface of the first end cap is specularly reflective to UV light.
7. The fluid treatment system of claim 1, wherein the second end cap is shaped as a truncated cone with a substantially planar end surface disposed away from the treatment zone, an area of the end surface of the second end cap being smaller than an area of the second window.
8. The fluid treatment system of claim 7, wherein the end surface of the second end cap is diffusively reflective to UV light.
9. The fluid treatment system of claim 7, wherein the end surface of the second end cap is specularly reflective to UV light.
10. The fluid treatment system of claim 1, wherein each of the first and second UV light sources comprises a light-emitting diode.
11. The fluid treatment system of claim 1, wherein UV light from the one or more first UV light sources and the one or more second UV light sources illuminates a volume disposed between the first and second windows substantially uniformly.

12. The fluid treatment system of claim 1, wherein a cross-sectional area of the flow cell substantially perpendicular to a flow direction between the fluid entry and the fluid exit is substantially circular.

13. The fluid treatment system of claim 1, wherein a cross-sectional area of the flow cell substantially perpendicular to a flow direction between the fluid entry and the fluid exit defines an n-sided polygon, wherein n=3 to 18.

14. The fluid treatment system of claim 13, wherein a perimeter cross-sectional area of the flow cell substantially perpendicular to a flow direction between the fluid entry and the fluid exit is substantially hexagonal.

15. The fluid treatment system of claim 1, wherein a cross-sectional area of at least one of the first or second end caps is substantially circular.

16. The fluid treatment system of claim 1, wherein a perimeter cross-sectional area of at least one of the first or second end caps defines an n-sided polygon, wherein n=3 to 18.

17. The fluid treatment system of claim 16, wherein a cross-sectional area of at least one of the first or second end caps is substantially hexagonal.

18. The fluid treatment system of claim 1, wherein at least one of the interior surface of the flow cell, the sidewall of the first end cap, or the sidewall of the second end cap comprises polytetrafluoroethylene having a thickness of 1 mm or greater.

19. The fluid treatment system of claim 18, wherein the thickness of the polytetrafluoroethylene is selected from the range of 1 mm to 10 mm.

20. The fluid treatment system of claim 1, wherein at least one of the first window or the second window comprises at least one of quartz, fused silica, or sapphire.

21. The fluid treatment system of claim 1, wherein at least one of the first or second end caps is shaped as (i) a cone with a tip disposed away from the treatment zone, or (ii) a cylinder having a planar end surface disposed away from the treatment zone.

22. The fluid treatment system of claim 1, wherein (i) the flow cell comprises an oblong tube, (ii) the fluid entry and fluid exit are disposed at opposite ends of the tube, and (iii) the fluid entry and fluid exit are positioned such that fluid flow therethrough is approximately perpendicular to fluid flow through the treatment region.

* * * * *